(12) United States Patent
Van Der Schaar et al.

(10) Patent No.: US 7,245,663 B2
(45) Date of Patent: Jul. 17, 2007

(54) METHOD AND APPARATUS FOR IMPROVED EFFICIENCY IN TRANSMISSION OF FINE GRANULAR SCALABLE SELECTIVE ENHANCED IMAGES

(75) Inventors: Mihaela Van Der Schaar, Ossining, NY (US); Hayder Radha, East Lansing, MI (US)

(73) Assignee: Koninklijke Philips Electronis N.V., Eindhoven (NL)

( * ) Notice: Subject to any disclaimer, the term of this patent is extended or adjusted under 35 U.S.C. 154(b) by 437 days.

(21) Appl. No.: 09/887,747

(22) Filed: Jun. 21, 2001

(65) Prior Publication Data

US 2002/0006161 A1 Jan. 17, 2002

Related U.S. Application Data

(63) Continuation-in-part of application No. 09/347,882, filed on Jul. 6, 1999, now Pat. No. 6,263,022.

(60) Provisional application No. 60/217,827, filed on Jul. 12, 2000.

(51) Int. Cl.
*H04N 7/12* (2006.01)
(52) U.S. Cl. ............................. 375/240.26; 375/240.28
(58) Field of Classification Search ............. 375/240.01–240.29; *H04N 7/12*
See application file for complete search history.

(56) References Cited

U.S. PATENT DOCUMENTS

| 5,886,736 | A | * | 3/1999 | Chen | 375/240.1 |
| 5,995,150 | A | * | 11/1999 | Hsieh et al. | 375/240.12 |
| 6,057,884 | A | * | 5/2000 | Chen et al. | 375/240.16 |
| 6,072,831 | A | * | 6/2000 | Chen | 375/240.03 |
| 6,263,022 | B1 | * | 7/2001 | Chen et al. | 375/240.03 |
| 6,275,531 | B1 | * | 8/2001 | Li | 375/240.12 |
| 2003/0026340 | A1 | * | 2/2003 | Divakaran et al. | 375/240.24 |

FOREIGN PATENT DOCUMENTS

| WO | WO9853613 | 4/1998 |
| WO | WO9819273 | 5/1998 |

* cited by examiner

*Primary Examiner*—Andy Rao
(74) *Attorney, Agent, or Firm*—Larry Liberchuk

(57) ABSTRACT

Improved efficiency in transmission of FGS encoded video data is achieved by reducing the transmission of overhead information items necessary to decode the received video data. After establishing an initial or first set of criteria for selectively enhancing areas within an image, each subsequent transmission frame includes an indicator that informs a receiving system to decode the current frame using the previously established criteria. The initial criteria include shift factor values specifying selectively enhanced areas of an image; position, displacement vector, size and enhancement factor for at least one area of interest with in an image; and known fixed values contained at both the transmitting and receiving systems.

40 Claims, 11 Drawing Sheets

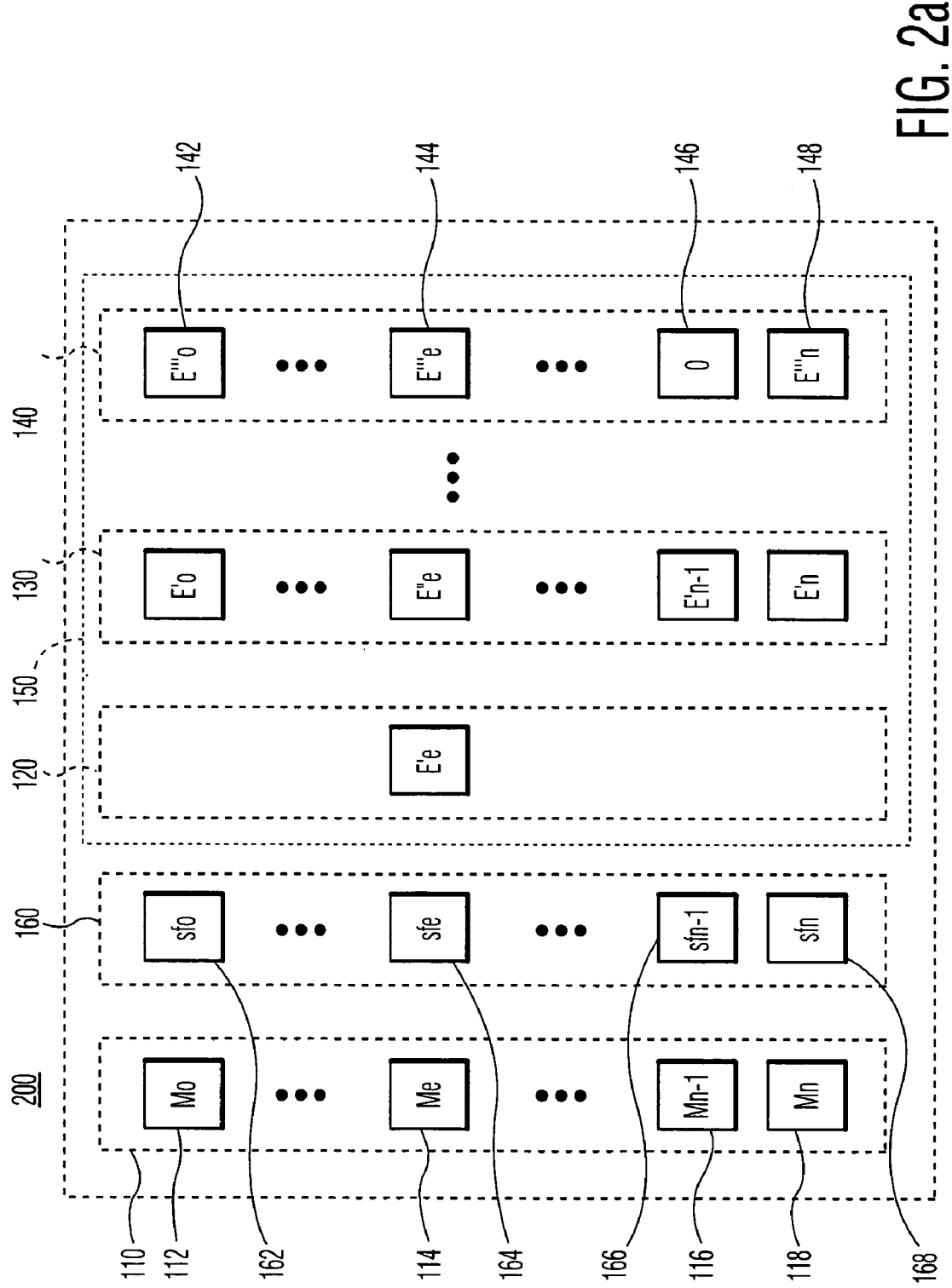

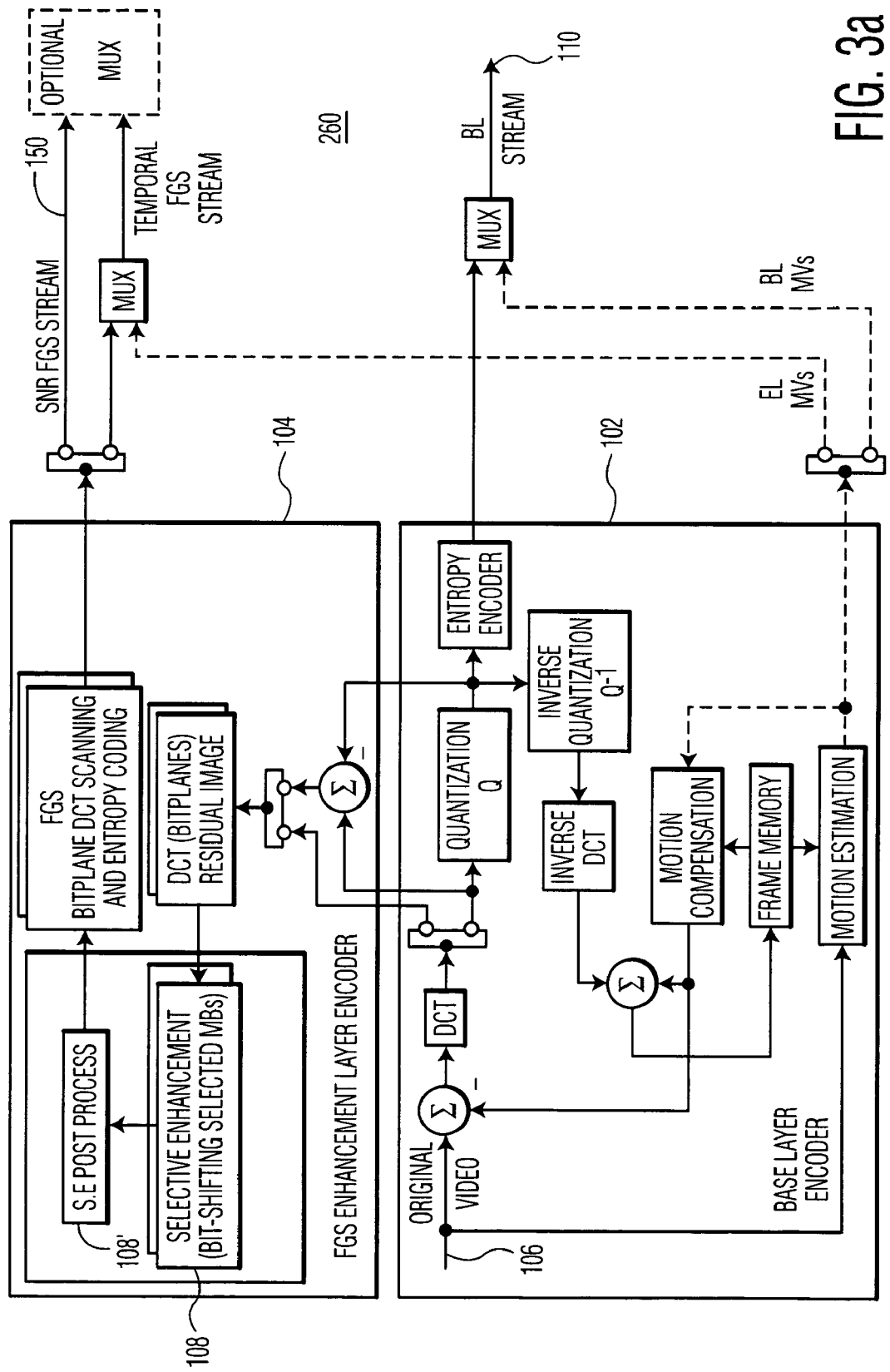

METHOD AND APPARATUS FOR IMPROVED EFFICIENCY IN TRANSMISSION OF FINE GRANULAR SCALABLE SELECTIVE ENHANCED IMAGES

RELATED APPLICATIONS

This application is related to

This application claims the benefit of U.S. patent application Ser. No. 60/217,827 filed Jul. 12, 2000, entitled "SYSTEM AND METHOD FOR FINE GRANULAR SCALABLE VIDEO WITH SELECTIVE QUALITY ENHANCEMENT," and is a continuation-in part of U.S. patent application Ser. No. 09/347,882, filed on Jul. 6, 1999, now U.S. Pat. No. 6,263,022 B1.

FIELD OF THE INVENTION

This invention relates generally to video encoding and more specifically to improving transmission efficiency of Fine Granular Scalable encoded video data by reducing the number of non-video data content bits.

BACKGROUND OF THE INVENTION

The MPEG-4 Fine-Granular Scalability (FGS) framework allows for different levels of compression for different parts of an image by using an adaptive quantization technique, referred to as Selective Enhancement. Utilizing Selective Enhancement techniques, designated areas of an image may achieve a higher quality level than non-designated areas of the image. More specially, the enhancement data layers of designated areas of an image are transmitted with a higher priority than enhancement data layers of non-designated image areas. The higher priority of a designated area is achieved by "shifting" the bit-lane of an image element, such as a pixel array or a plurality of pixel arrays, i.e., a macroblock, to a higher priority level. Consequently, an enhancement factor or shift factor is associated to each array or macroblock.

A disadvantage of the current adaptive quantization method is that the shifting factors on the individual macroblocks are transmitted for each array or macroblock. This represents a significant overhead in transmission time and required bandwidth. The addition of enhancement or shifting factors consequently diminishes the image quality as the number of enhancement bits transmitted is reduced by the number of shifting factor bits transmitted.

Hence, there is a need to improve the efficiency of video data content bit transmission by reducing the number of non-video data content bits, such as enhancement factors transmitted.

SUMMARY OF THE INVENTION

A method for improving the transmission efficiency of an video signal encoded in a base layer and an enhancement layer wherein at least one element of said enhancement layer is selectively enhanced by designating said at least one selected element to have a higher priority of transmission by reformatting the data stream so that a first frame is transmitted having a first set of enhancement criteria and then transmitting an indicator in each subsequent transmission frame when the selective elements contained therein have substantially the same set of enhancement criteria as the first enhancement criteria.

BRIEF DESCRIPTION OF THE FIGURES

FIG. 2a illustrates a conventional selectively enhanced image composition;

FIG. 2b illustrates a conventional video stream of the image shown in FIG. 1a;

FIG. 3a illustrates an FGS system employing selective enhancement technology in accordance with the principles of the invention;

FIG. 6b illustrates an exemplary selectively enhanced composition of the image shown in FIG. 5a;

Figure 1:
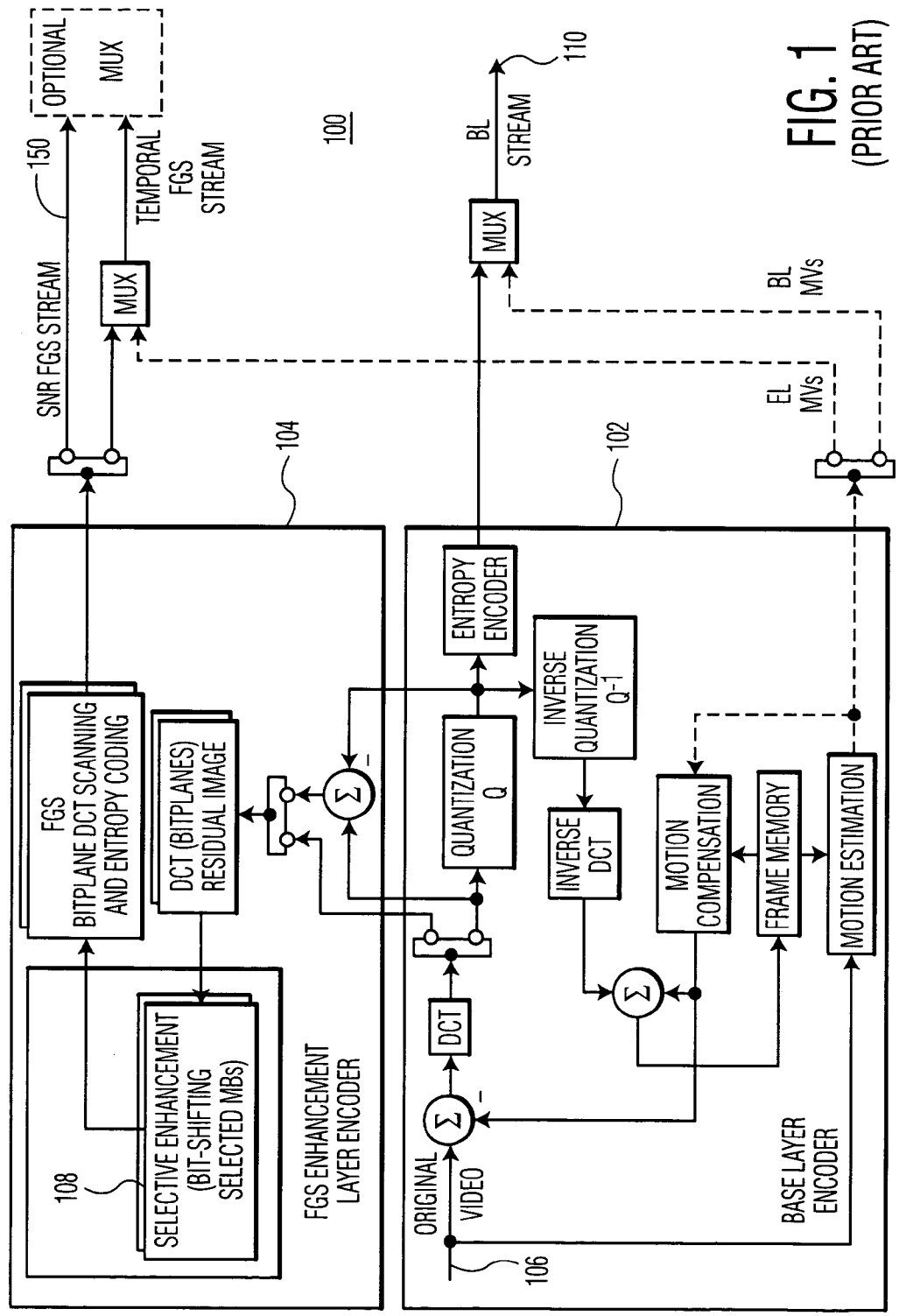
FIG. 1 depicts a conventional FGS system employing selective enhancement technology.

It is to be understood that these drawings are solely for purposes of illustrating the concepts of the invention and are not intended as a level of the limits of the invention. It will be appreciated that the same reference numerals, possibly supplemented with reference characters where appropriate, have been used throughout to identify corresponding parts.

DETAILED DESCRIPTION OF THE INVENTION

FIG. 1 is representative of a conventional Fine Granular Scalability (FGS) video encoding system 100 employing selective enhancement technology. As illustrated, this system is composed of a base layer encoder 102 and an enhancement layer encoder 104. The base layer encoder 102 includes a DCT block, a quantization block and an entropy encoder block that generates part of the BL stream from the original video. The base layer encoder 102 also includes the motion estimation block that produces base layer and enhancement layer motion vectors (motion compensation information) from the original video. The base layer encoder 102 further includes an inverse quantization block, an inverse DCT block, motion-compensation block and frame-memory, which are utilized when computing the enhancement layer motion-compensated residual images. Original video signal 106 is digitally encoded and quantized by base layer encoder 102 and produces a base layer signal (BL) 110 which contains sufficient information that is representative of a minimally acceptable video signal. Base layer signal 110 may also include the earlier described motion compensation information.

Original video signal 120 is also provided to enhancement layer encoder 104 along with the digitize and quantized signal base layer signal 110. The enhancement layer encoder 104 includes a DCT residual image block for storing the residual images and motion-compensated residual images. The residual images are generated by a subtracts the DCT block output from the input of quantization block. The motion-compensated residual image outputed directly from the DCT block. Enhancement layer encoder 104 determines a residual error as the difference between the original video signal and the quantized base layer signal 110. Enhancement layer encoder 104 create enhancement layer 150 containing information items, which when applied to transmitted BL layer signal 110 removes the errors of quantization and improves the original image quality. The number of information items within enhancement layer 150 that are tranmitted depends on the bandwidth available. Hence, each information item (e.g., bit-plane) within enhancement layer 150 may not be transmitted during a frame. Consequently, those areas of a transmitted image that are transmitted first tend to have better quality than those transmitted latter.

Selective Enhancement device 108 processes information items within enhancement layer 150 so that information items corresponding to designated areas within an image are transmitted at a higher priority than other areas of the image. As will be appreciated, selective enhancement device 108 may be any type of processor, such as a general-purpose microcontroller or microprocessor or special purpose processor that may be programmed using general coding instructions. Selective enhancement device 108 may also be a custom device such as a discrete logic components, programmable algorithmic logic device (PAL), field programmable gate array (FPGA) or application specific integrated circuit (ASIC), that is dedicated to receiving an input stream and process the input stream to produce a desired output stream.

FIG. 2a illustrates a image composition 200 composed of a base layer 110, an enhancement layer 150 and a shift factor layer 160 generated in accordance with a conventional FGS system employing selective enhancement technology. In this illustrative example, base layer 110 is composed of a plurality of data blocks, illustrated as numbered blocks 112, 114, 116, 118, which are conventionally selected as being composed of four 8×8 matrices of image pixels (i.e., macroblock). Enhancement layer 150, as illustrated is composed of a plurality of bit-planes, represented as planes 120, 130 and 140, which contain information representative of priority levels of corresponding macroblocks. Bit-plane 130 contains information regarding the most significant bit of the expected quantization error of corresponding macroblocks, while bit-plane 140, represents information regarding the least significant bit of the expected quantization error of corresponding macroblocks. Bit-plane 120 contains information regarding the quantization error scaled to achieve a higher priority. In this exemplary illustration, the information regarding the quantization is scaled such that the most significant bit of the expected quantization error of corresponding macroblock 114, represented as $E'_e$, is transmitted prior to the most significant bit of the expected quantization error corresponding to first macroblock 110, represented as $E'_o$. Similarly, information regarding the next most significant bit of the quantization error of a corresponding macroblock 114, represented as $E''_e$ is shifted such that it is transmitted prior to the next most significant bit of the quantization error of first macroblock 110, represented as $E''_o$.

Shifting of the informational data regarding quantization error is continued for each bit-plane of the correspondingly selected at least one macroblock. As will be appreciated, FGS with selective enhancement technology allows for even higher levels of priority, such that, all of the bit-planes corresponding to macroblock 114, for example, may be transmitted prior to the most significant bit of the expected quantization error corresponding to macroblock 110. Although only a single macroblock is shown being selectively enhanced, it will be appreciated that any number of macroblocks, individually or continuously, can be chosen for selective enhancement.

Shift factor layer 160 is composed of illustrated blocks 162, 164, 166, 168, which provide information regarding the level of priority, or enhancement for each corresponding macroblock. In one embodiment of the invention, the enhancement factor may be a shift factor that contains two bits. This allows for a priority increase, or enhancement, by a factor of four. That is, the four most significant bit plane containing quantization error data corresponding to the selected at least one macroblock may be transmitted prior to the transmission of the most significant bit of the first macroblock. As will be appreciated, the number of bits of the enhancement, or shift, factor many be any number of bits to achieve a desired level of prioritization.

Figure 2B:
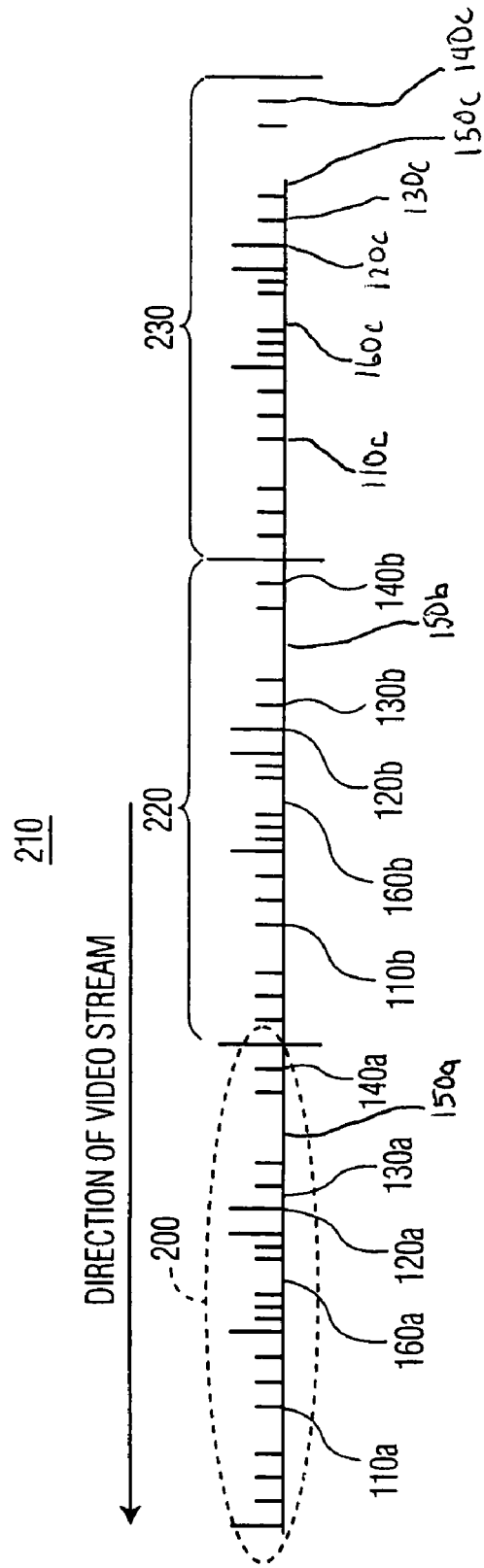

FIG. 2b illustrates a conventional video stream transmission 210 illustratively composed of three video-encoded images. The first streams corresponds to image 200 FGS encoded as illustrated in FIG. 2a and streams 220 and 230 are associated with FGS encoding of images subsequent to image 200. Referring to the video stream corresponding to image 200, the transmission sequence includes base layer 110a, enhancement or shift factor layer 160a, selectively enhanced bit-plane layer 120a, then as many of bit-plane layers, 130a, 140a, within enhancement layer 150a that may be accommodated by the available bandwidth (BW). Within second frame 220, the transmission sequence includes base layer 110b, shift factor layer 160b, selectively enhanced bit-plane layer 120b, then as many of the bit-plane layers, 130b, 140b, within enhancement layer 150b that may be accommodated by the available bandwidth. Similarly, within third frame 230 the transmission sequence includes base layer 110c, shift factor layer 160c, selectively enhanced bit-plane layer 120c, then as many of the bit-plane layers, 130c, 140c, within enhancement layer 150c that may be accommodated by the available bandwidth. In this illustrative example, the designation of 110a, 110b, 110c, etc., for example, is used to distinguish base layer information within different images and transmission frames.

It will be appreciated that transmission bandwidth may vary significantly during a video stream transmission and, consequently, the number of enhanced bit-planes actually transmitted may vary from image to image. For example, transmission bandwidth over a communication link, such as the Internet, varies as the number of users on the network changes. Hence, while a base layer will always be transmitted, as this contains a minimally acceptable signal, the number of enhancement layer bit-planes that can be transmitted varies. Consequently, the quality of one received image may vary significantly from the received quality of a second image.

FIG. 3a illustrates an encoding system 260 utilizing a selective enhancement technology in accordance with the principles of the invention. In this illustrative embodiment of the invention, the system comprises a base layer encoder 102 and an enhancement layer encoder 104. The base layer encoder 102 includes a DCT block, a quantization block and an entropy encoder block that generates part of the BL stream from the original video. The base layer encoder 102 also includes the motion estimation block that produces base layer and enhancement layer motion vectors (motion compensation information) from the original video. The base layer encoder 102 further includes an inverse quantization block, an inverse DCT block, motion-compensation block and frame-memory, which are utilized when computing the enhancement layer motion-compensated residual images. Original video signal 106 is digitally encoded and quantized by base layer encoder 102 and produces a base layer signal (BL) 110 which contains sufficient information that is representative of a minimally acceptable video signal. Base layer signal 110 may also include the earlier described motion compensation information. The selective enhancement block 108' includes processing in addition to the selective enhancement block 108 of FIG. 1 to improve the efficiency of the transmission of video encoded data. As will be appreciated, additional processing contained in block 108' may be included in selective enhancement block 108 and may be performed upon completion of the processing of block 108 or concurrently therewith.

Figure 3B:
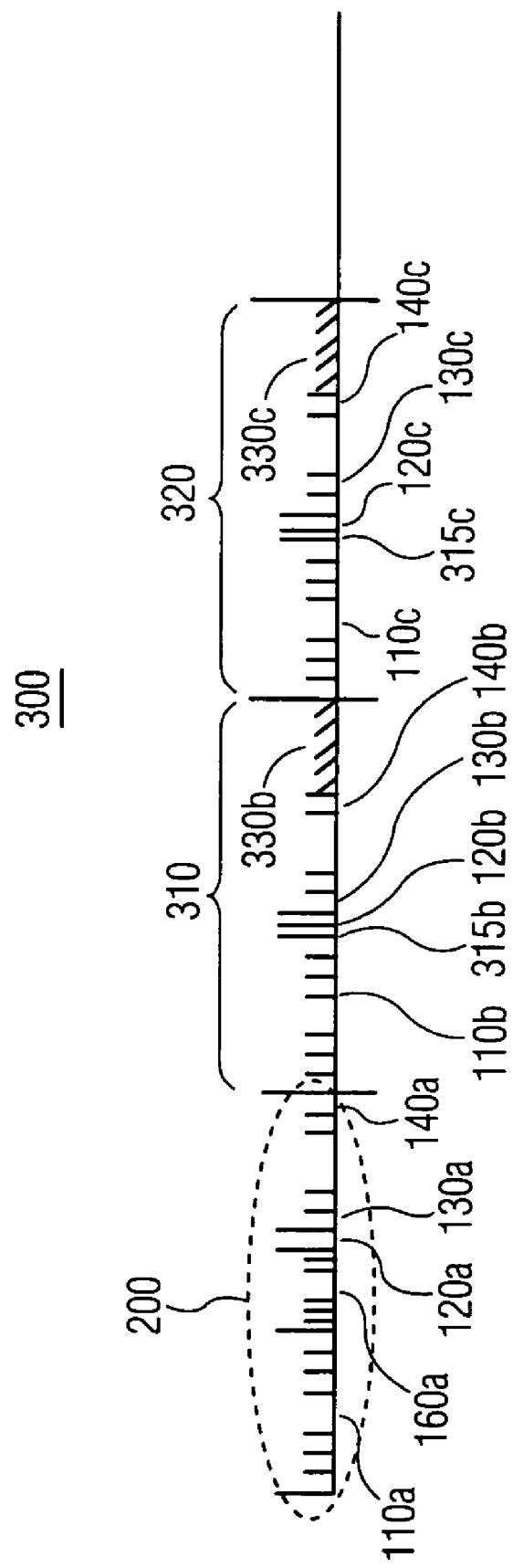
FIG. 3b illustrates a selectively enhanced video stream in accordance with one aspect of the principles of the invention.

FIG. 3b illustrates a video stream transmission 300 in accordance with one aspect of the principles of the invention illustratively composed of three selectively enhanced images. In this aspect of the invention, image 200 is transmitted as previously described, i.e., base layer 110a, shift layer criteria 160a, high priority bit-plane 120a and as many additional bit-planes 130a, 140a, that may be accommodated by the available BW. After an initial or a first set of enhancement criteria or factors, for example criteria 160a in image 200, is established, then an indicator is used in subsequent transmissions to apply a previously established criterion to the current transmission frame. Hence, after image 200 is transmitted, with shift factor layer 160a as an initial or first set of criteria, indicator 315b is included within transmission block 310 to indicate the application of the previously established criteria, i.e., shift factors 160a, to the video data within transmission frame 310. Hence, transmission frame 310 is composed of base layer 110b, indicator 315b, high priority bit-plane 120b, and available bit-planes 130b, 140b, etc.

Further illustrated in stream 300 is region 330b, which is created, in the fixed transmission bandwidth depicted, by the removal of shift factor criteria layer 160b. The removal of shift factor criteria layer 160b by the incorporation of indicator 315b is advantageous as the removal of a plurality of enhancement layer reduces the number of overhead or non-video content bits required to be transmitted. These removed bits may then be replaced with additional bit-planes of enhancement layer 150. Hence, region 330b may be used to include additional enhancement layer bit-planes, which further improves the quality of the received image.

Similarly, with regard to transmission frame 320, indicator 315c is included to indicate the application of a previously established shift factor criteria to the enhancement layer blocks, as represented by 120c, 130c, 140c, contained within frame 320. As will be appreciated, indicator 315 is included in each subsequent transmission frame until a new shift factor criteria is established.

Figure 4:
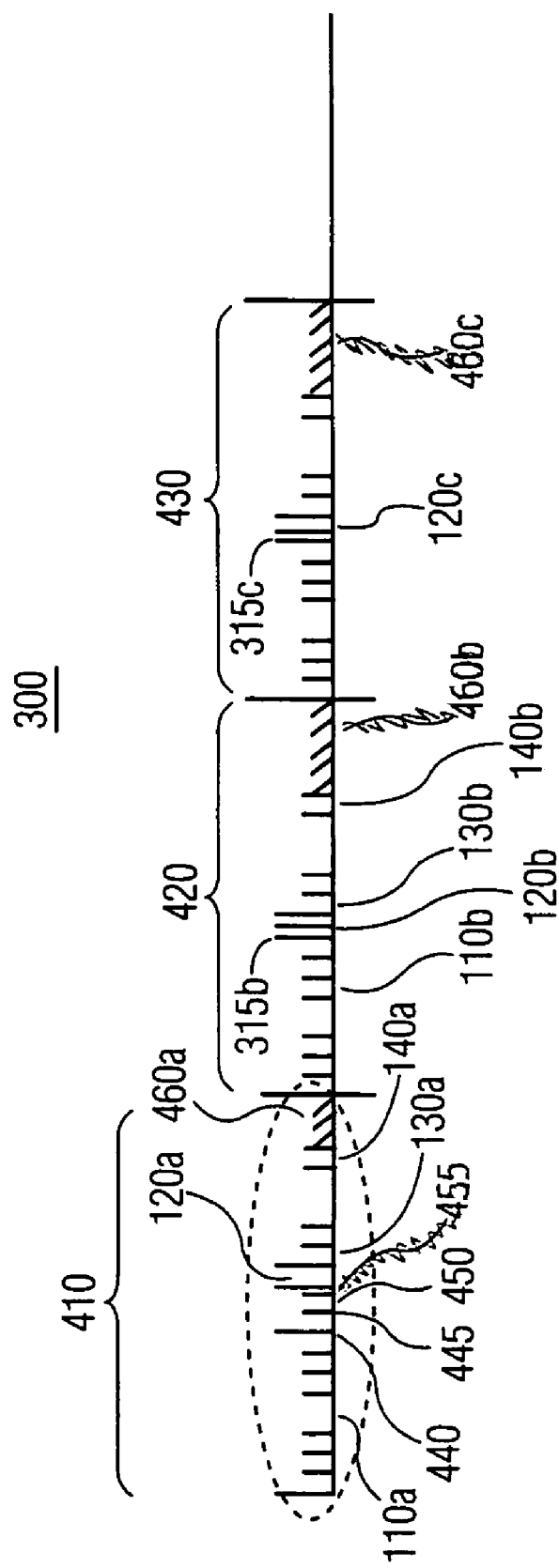
FIG. 4 illustrates a selectively enhanced video stream in accordance with a second aspect the invention.
Figure 5A:
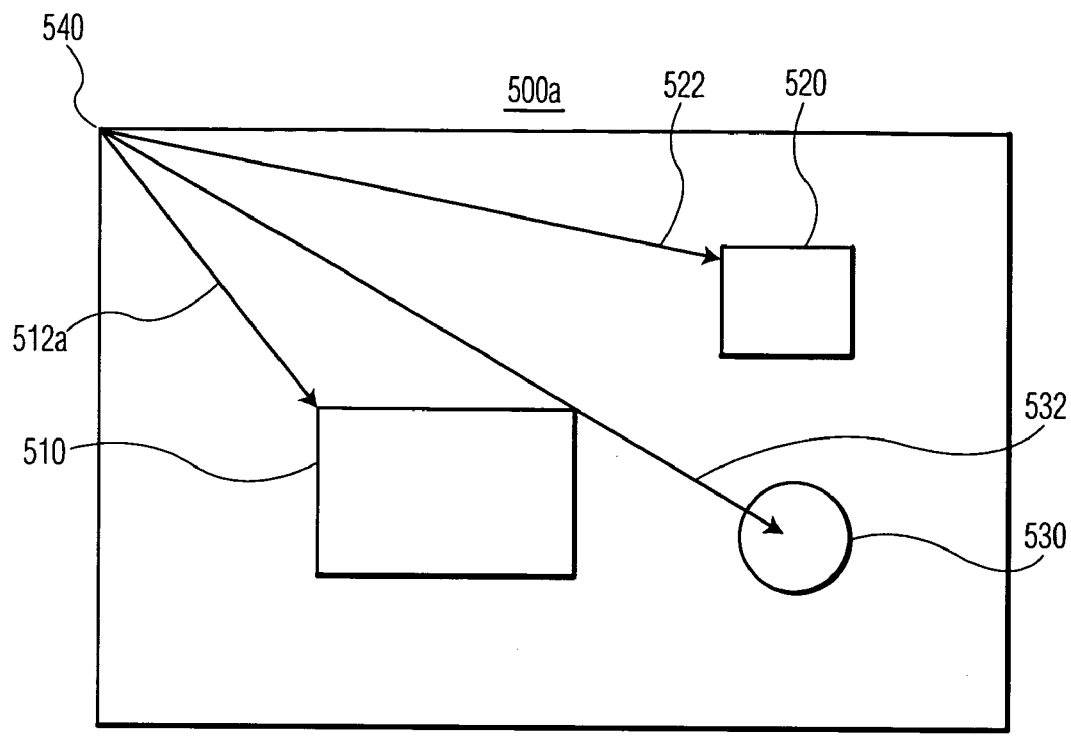
FIGS. 5a and 5b illustrate areas of interest within an image chosen for selective enhancement.

FIG. 4 illustrates a video stream transmission 400 in accordance with a second aspect of the invention, which is illustratively composed of three selectively enhanced transmission frames 410, 420, 430. In this aspect of the invention, an initial, or first, set of position and size values are used to specify areas of interest within an image that are to be selectively enhanced. In this example, transmission frame 410 includes base layer 110a, position value(s) 440, and size value(s) 445. Additionally, shift factor 450 associated with the specified areas of interest is included to provide information regarding the level of priority or enhancement assigned to each of the specified area. FIG. 5a illustrates one method for specifying areas of interest within an image. In this example, an area, such as the rectangular areas 510 or 520 or circular area 530 is specified by position vectors, 512a, 522, 532, respectively, with regard a known point 540, e.g., upper left corner, associated with image 400a. The position of rectangular areas 510, 520 may also be specified as starting at a particular numbered macroblock, which is numbered with regard to a known numbering sequence. Similarly, the size of areas 510, 520 can be expressed as a number of macroblocks, blocks, pixels, etc., horizontally and vertically, with regard to an expressed starting position. Circular area of interest 530 may be specified by a position value directed to the center of the circular area and a radius value from the center. Although areas of interest 510, 520 are illustrated as rectangular and area 530 is illustrated as circular, it would be appreciated that the areas of interest may also be chosen as square, triangular, elliptical, etc.

Returning to FIG. 4, in accordance with this aspect of the invention, only information items concerning areas of interest are transmitted. Hence, only position, size and corresponding scale factor for each designated area of interest is transmitted. Scale factor blocks for corresponding macroblocks that are not selective enhanced, or are within the designated at least one area of interest, are not included in the transmission sequence. This allows for the further reduction in the amount of information items that are not part of the transmitted video content and can be replaced by additional enhancement layers.

The specification of chosen areas of interest by position, size and scale factor is advantageous when the quantity of data necessary to specify at least one area of interest is less than the quantity of data necessary to specify the scale factor for each selectively enhanced macroblock, as described with regard to FIG. 2b. For example, the removal of scale factor blocks from transmission of image 410 reduces the number of data items transmitted, and, hence, allows the transmission of additional bit-planes of enhancement layer 150. In the illustrated example, the reduction in overhead data transmitted permits the transmission of addition bit-planes of enhancement layer 150 illustrated as region 460a.

FIG. 4 further illustrates the application of indicators 315b and 315c as previously described, in subsequent transmission frames 420 and 430 respectively, to indicate the application of previously established criteria to a current transmission frame. Accordingly, the position 440, size 445,and shift factor criteria 450 for each of the at least one area of interest designated within transmission frame 410 are applied to the current transmission frame.

Figure 5B:
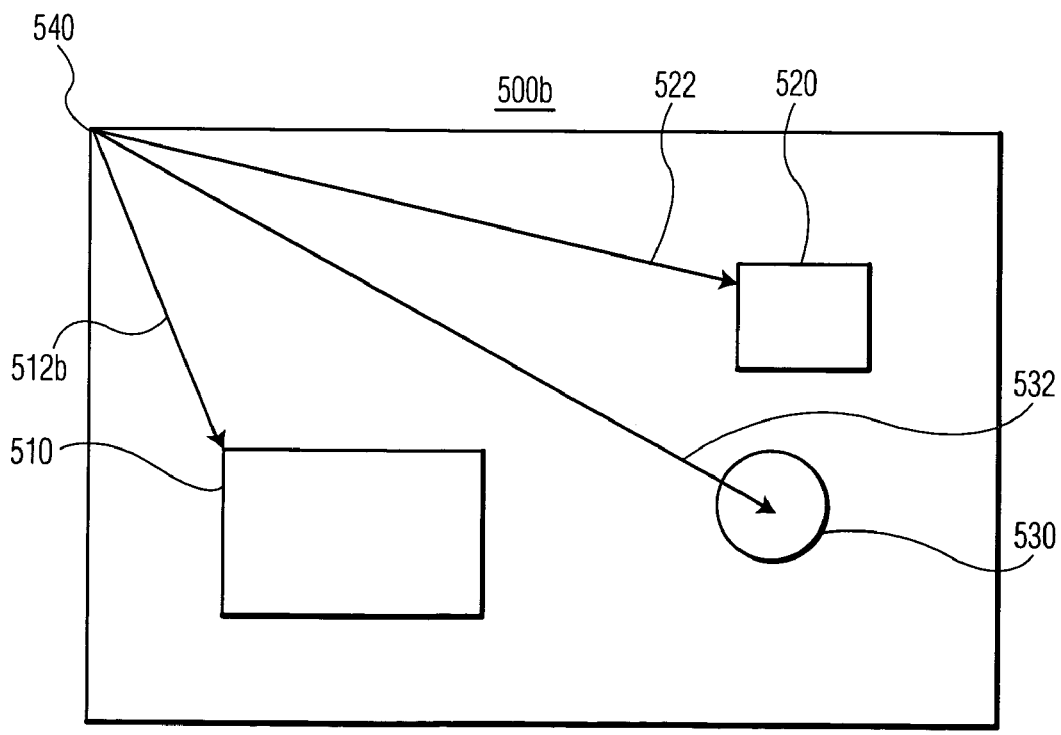
Figure 5C:
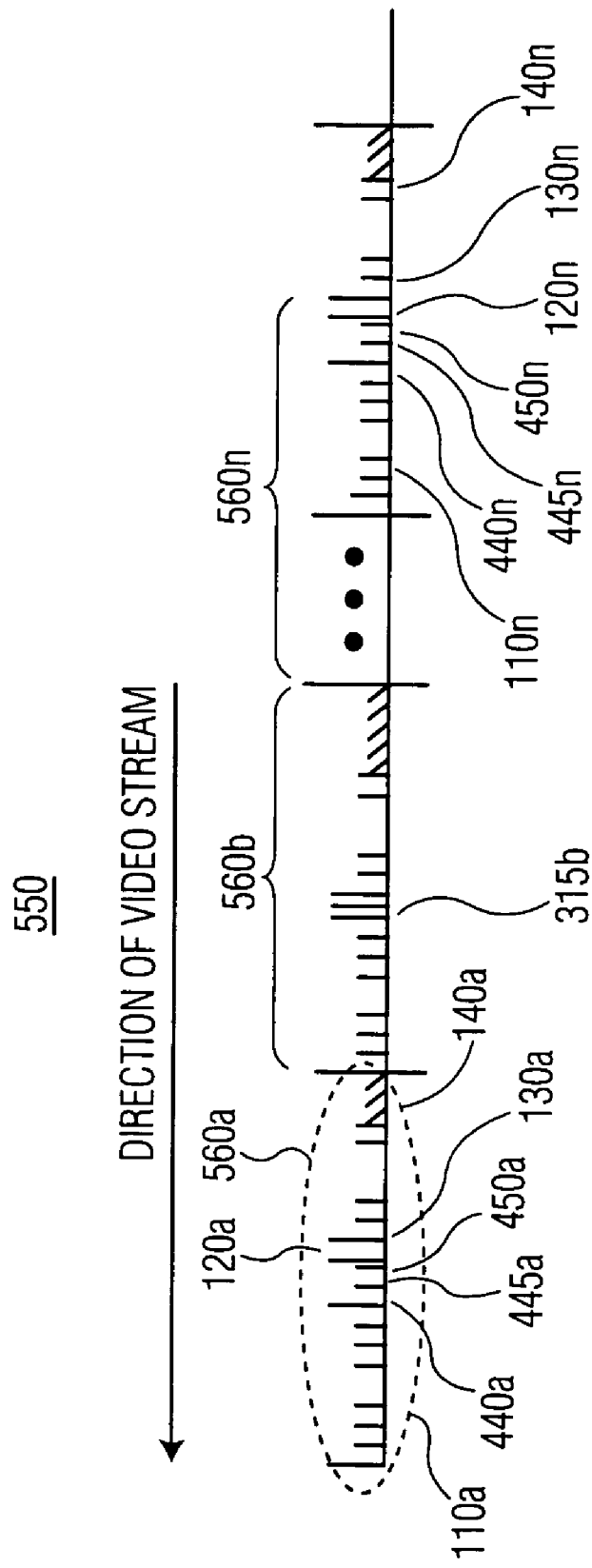
FIG. 5c illustrates an exemplary video stream in accordance the principles of the invention with regard to FIGS. 5a and 5b.

Referring collectively to FIGS. 5a-5c there is illustrated an example of the application of the present invention to a changing position of an area of interest within an image. FIG. 5a illustrates an initial position of areas of interest 510, 520, 530 within image 500a. In this example, areas of interest 510, 520, 530 are specified by position vector 512a, 522, 532, respectively, and size. FIG. 5b illustrates a change in position of area of interest 510 within image 500b, while areas 520, 530 remain substantially unchanged. The change in position are 510 is denoted by the change in position vector as represented as vector 512b, which is to be transmitted. As will be appreciated a displacement vector, representative of the difference between position vector 512a and 512b, can be transmitted in place of position vector 512b.

FIG. 5c illustrates a video stream 550 in accordance with the principles of the present invention, wherein only information items regarding areas of interest are transmitted.

Included in transmission frame 560a are position 440a, size 445a and scale factor 450a of each of the illustrated areas of interest 510, 520, 530. Further illustrated are selected enhancement layers 120a, 130a, 140a. As will be appreciated, selected enhancement layer 120a corresponds to each element, array or macroblock associated with the corresponding size 445a and each area of interest is associated with an independently determined level of enhancement.

Transmission frame 560b illustrates the use of indicator 315b, as previously discussed, to apply position, size and shift factor enhancement of frame 560a to the current frame.

Transmission frame 560n corresponding to the changes in image 500a, represented as image 500b shown in FIG. 5b. In this case, because the position of area of interest 510 has changed, a new set of criteria must be established In this case, new position 440n, size 445n and scale factor 450n for each of the areas of interest must be transmitted. Although illustrated as a position change, it will be appreciated, that other criteria can also be changed to cause changes in the enhancement level of the received signal.

Figure 6A:
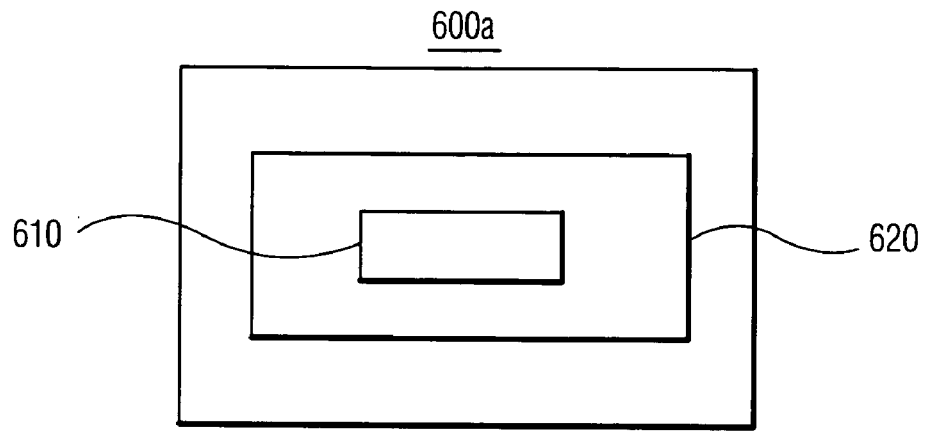
FIG. 6a illustrates a video image having exemplary known selective enhanced image areas.

FIG. 6a illustrates a further aspect of the invention, wherein criterion are fixed and known with regard to position, size or enhancement criteria. In this illustrative case, areas 610 and 620 of image 600a are known fixed areas having known levels of shift factors. In this example, area 610 is enhanced by a factor of two, while area 620 is enhanced by a factor of one. As will be appreciated shift factors corresponding to known fixed areas 610, 620, can also be transmitted, when the enhancement priority level of these areas changes. In this case, an indication of the application of new shift factor enhancement values is included in the transmission stream.

Figure 6B:
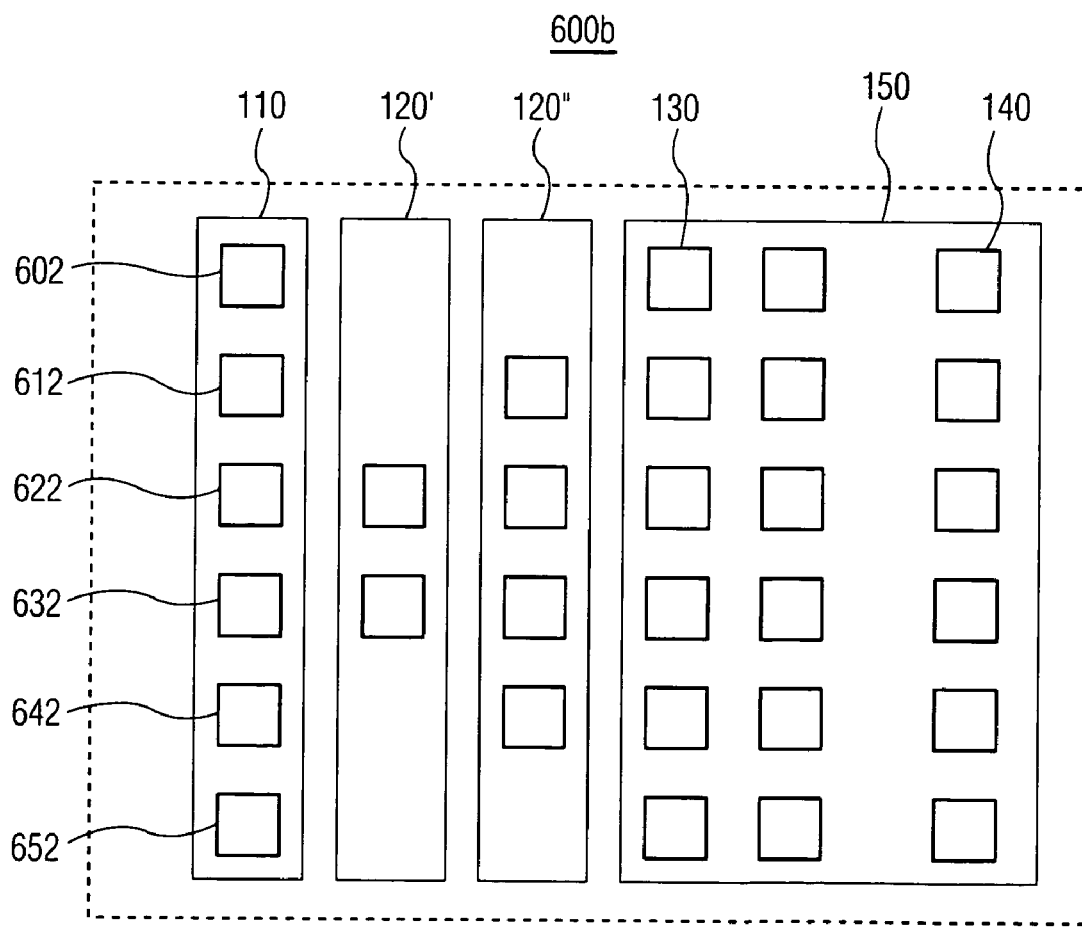

FIG. 6b illustrates the encoding of image 600a in accordance with known selective enhancement technology using known predetermined position, size and scale factor criteria. Accordingly, macroblocks 612 through 642, which are representative of area 620 in this illustrative example, are enhanced by a factor of one, i.e., shifted into a higher priority bit-plane, represented as 120". Similarly, macroblocks 622, 632, which are representative of area 610, are enhanced by a factor of two, i.e., shifted into a second bit-plane represented as 120'. As will be appreciated, the above example is representative of known shift factor not being transmitted. However, shift factor values can be included in the transmission frame when the level of enhancement changes. In this case an indicator is added to the transmission frame to indicate the application of the new shift factor values to the known fixed areas.

Figure 6C:
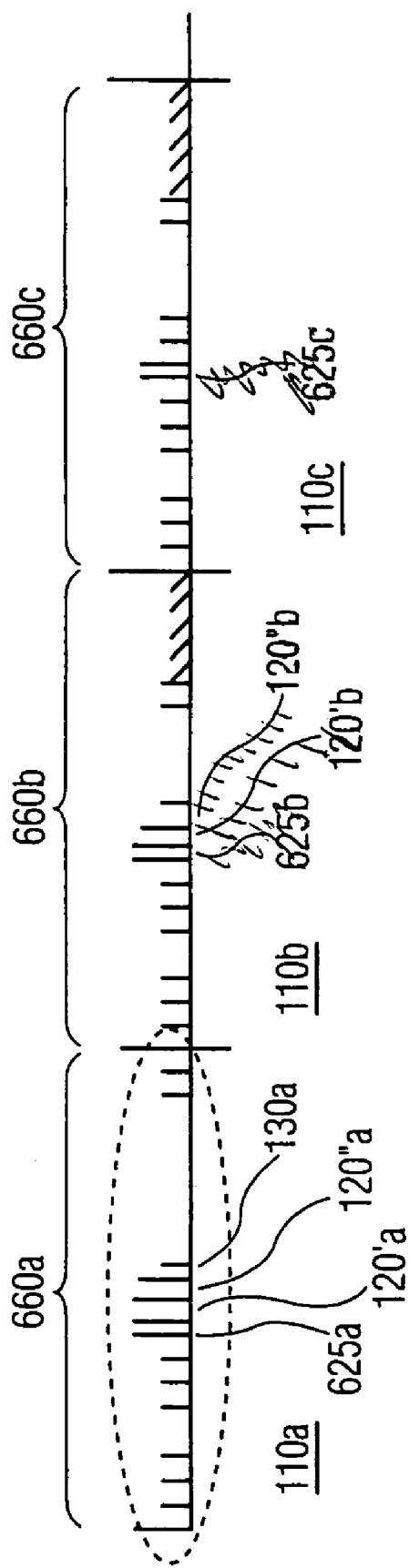
FIG. 6c illustrates a selectively enhanced video stream of the image shown in FIGS. 6a and 6b in accordance with another aspect of the invention.

FIG. 6c illustrates a video stream 610, illustrative composed of three frames 660a, 660b, 660c, wherein frame 660a is associated with the composed image 600b illustrated in FIG. 6b. In this example, frame 660a is composed of base layer 110a, indicator 625a, first shifted enhancement layer 120'a, second shifted enhancement layer 120"a and as many remaining enhancement layers 130a, 140a, that may be included in the available transmission bandwidth. Indicator 625a is used to provide information to a receiving system to use known predetermined position, size and scale factor data. Hence, these information data items need not be transmitted. Transmission of known fixed information items is advantageous as a minimum of non-video content related items need be transmitted. Hence, additional bit-planes of enhancement layer 150 may be transmitted. Further still, indicator 625a may include a plurality of bits that may be used as a code to the receiving system to decode the video stream using different predetermined position, size and enhancement factors.

Figure 7:
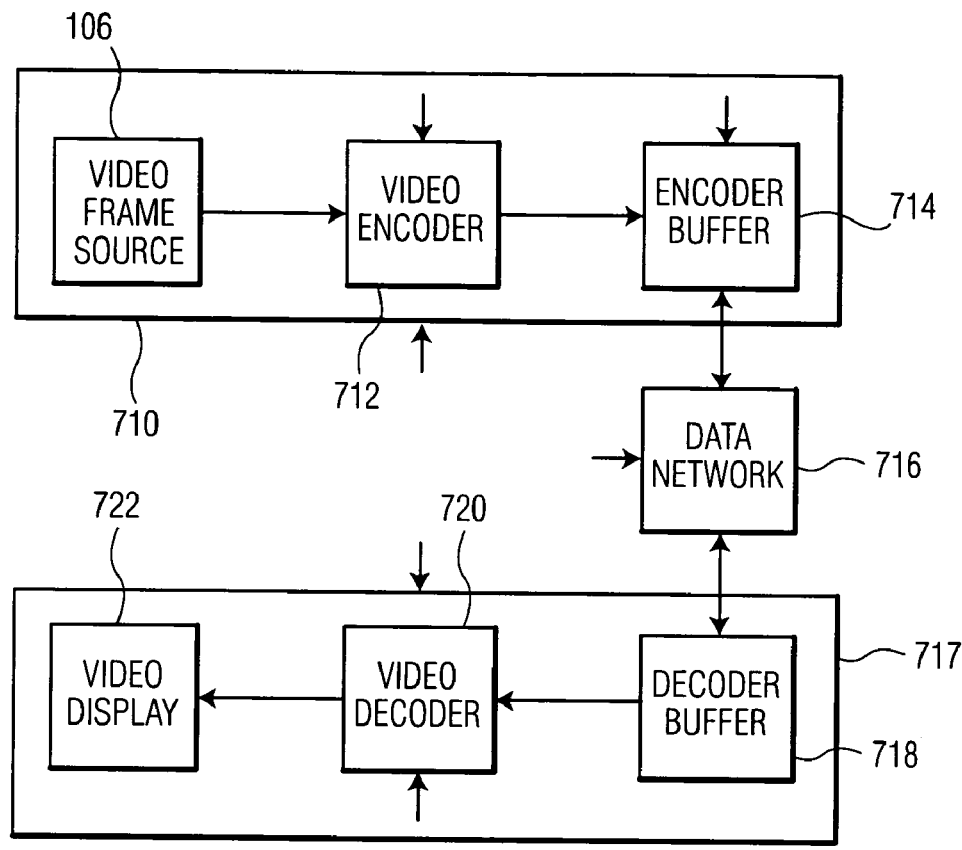
FIG. 7 illustrates an exemplary transmission/receiving system utilizing the inventive concept of the present invention.

FIG. 7 illustrates a typical transmission system 700 utilizing the present invention. Video data is provided by video frame source 106 to video encoding unit 712. Video encoding unit 712 includes encoder 260 illustrated in FIG. 3a. Video encoded data is then stored in encoder buffer 714 for transmission over data network 716. At receiving system 717, the received data frames are stored in decoder buffer 718 and provided to video decoder 720. Video decoder 720 extracts information items regarding indications of criteria of selectively enhanced information items, for example, and uses previously transmitted enhancement criteria to decode a current transmission frame. The decoded information is then presented on video display 722.

Figure 8:
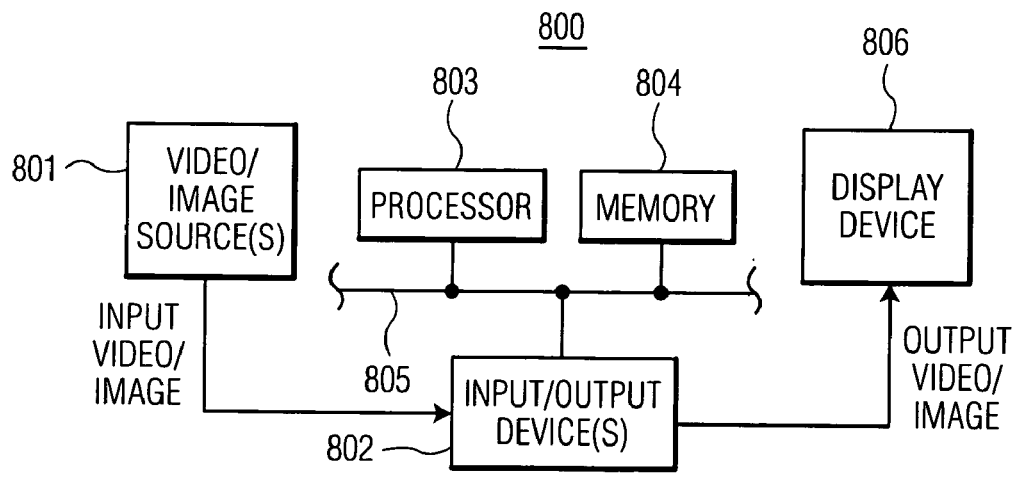
FIG. 8 illustrates a exemplary system in accordance with the principles of the invention.

FIG. 8 shows an exemplary embodiment of a system 800 which may be used for implementing the principles of the present invention. System 800 may represent a television, a set-top box, a desktop, laptop or palmtop computer, a personal digital assistant (PDA), a video/image storage device such as a video cassette recorder (VCR), a digital video recorder (DVR), a TiVO device, etc., as well as portions or combinations of these and other devices. System 800 includes one or more video/image sources 801, one or more input/output devices 802, a processor 803 and a memory 804. The video/image source(s) 801 may represent, e.g., a television receiver, a VCR or other video/image storage device. The source(s) 801 may alternatively represent one or more network connections for receiving video from a server or servers over, e.g., a global computer communications network such as the Internet, a wide area network, a metropolitan area network, a local area network, a terrestrial broadcast system, a cable network, a satellite network, a wireless network, or a telephone network, as well as portions or combinations of these and other types of networks.

The input/output devices 802, processor 803 and memory 804 may communicate over a communication medium 805. The communication medium 805 may represent, e.g., a bus, a communication network, one or more internal connections of a circuit, circuit card or other device, as well as portions and combinations of these and other communication media. Input video data from the source(s) 801 is processed in accordance with one or more software programs stored in memory 804 and executed by processor 803 in order to generate output video/images supplied to a display device 806.

In a preferred embodiment, the coding and decoding employing the principles of the present invention may be implemented by computer readable code executed by the system. The code may be stored in the memory 804 or read/downloaded from a memory medium such as a CD-ROM or floppy disk. In other embodiments, hardware circuitry may be used in place of, or in combination with, software instructions to implement the invention. For example, the elements illustrated herein may also be implemented as discrete hardware elements.

Although the invention has been described and pictured in a preferred form, it is, however, understood that the present disclosure has been made only by way of example, and that numerous changes in the details may be made without departing from the spirit and scope of the invention as hereinafter claimed. For example, the indicators described may be designated by individual settings that describe a specific method employed in a transmission frame. Or the indicators may be coded values with a fixed number of transmission bits within a transmission frame. Or the indicators may be a single setting that specifies the presence of a specific method employed in a transmission frame. It is intended that the patent shall cover by suitable expression in the appended claims, those features of patentable novelty that exists in the invention disclosed.

We claim:

1. A method for improving the transmission efficiency of an original video signal transmitted as a plurality of frames, said frames containing said video signal encoded in a base layer and an enhancement layer wherein at least one element of said enhancement layer is selectively enhanced by designating said at least one element to have a higher priority of transmission, said method comprising:
   transmitting a first set of criteria for one of said frames; and
   transmitting an indicator that causes said first set of criteria to be used for a subsequent one of said frames if a second set of criteria for the subsequent one of said frames is substantially the same as said first set of criteria, without transmitting said second set of criteria.

2. The method as recited in claim 1 wherein said first set of criteria includes at least one enhancement factor value.

3. The method as recited in claim 2 wherein said at least one enhancement factor value is applied to each element within in said enhancement layer.

4. The method as recited in claim 2 wherein said at least one enhancement factor value is power of two.

5. The method as recited in claim 1 wherein said first set of criteria includes position, size and enhancement factor value.

6. The method as recited in claim 5 wherein said position is selected with respect to a known point.

7. The method as recited in claim 1 wherein said first set of criteria includes at least a second indicator that indicates a corresponding known value.

8. The method as recited in claim 7 wherein said known value is selected from the group consisting of position, displacement vector, size, and enhancement factor.

9. The method as recited in claim 7 wherein said indicator is substantially the same as said at least a second indicator.

10. The method as recited in claim 1 wherein said at least one element comprises a plurality of pixels in an array having an equal number of rows and columns.

11. The method as recited in claim 10 wherein the number of rows is selected from the group consisting of 2, 3, 4, 8, and 16.

12. The method as recited in claim 1 wherein said enhancement layer is fine granular scalability encoded.

13. A device for reformatting frames of a video data stream for improving the transmission efficiency of said video data steam, wherein said video data stream includes a base layer and an enhancement layer wherein at least one element of said enhancement layer is selectively enhanced by designating said at least one element to have a higher priority of transmission, said device comprising:
   means for receiving frames of said enhancement layer;
   means for generating a first set of criteria for one of said frames; and
   means for generating an indicator that causes said first set of criteria to be used for a subsequent one of said frames if a second set of criteria for the subsequent one of said frames is substantially the same as said first set of criteria, wherein when said subsequent one of said frames includes said indicator, said subsequent one of said frames will not include said second set of criteria.

14. The device as recited in claim 13 wherein said first set of criteria includes at least one enhancement factor value.

15. The device as recited in claim 14 wherein said at least one enhancement factor value corresponds to each element within in said enhancement layer.

16. The device as recited in claim 14 wherein said at least one enhancement factor value corresponds to said at least one element.

17. The device as recited in claim 14 wherein said at least one enhancement factor value is power of two.

18. The device as recited in claim 13 wherein said first set of criteria includes position, size and enhancement factor value.

19. The device as recited in claim 18 wherein said position is selected with respect to a known point.

20. The device as recited in claim 13 wherein said first set of criteria includes at least a second indicator that indicates a corresponding known value.

21. The device as recited in claim 20 wherein said known value is selected from the group consisting of position, displacement vector, size, and enhancement factor.

22. The device as recited in claim 20 wherein said indicator is substantially the same as said at least a second indicator.

23. The device as recited in claim 13 wherein said element comprises a plurality of pixels contained in an array having an equal number of rows and columns.

24. The device as recited in claim 23 wherein the number of rows is selected from the group consisting of 2, 3, 4, 8, and 16.

25. The device as recited in claim 13 wherein said enhancement layer is fine granular scalability encoded.

26. An apparatus for coding video, said apparatus being operational to improve the transmission efficiency of a video signal transmitted as a plurality of frames, said frames containing said video signal encoded in a base layer and an enhancement layer wherein at least one element of said enhancement layer is selectively enhanced by designating said at least one element to have a higher priority of transmission, said apparatus comprising:
   means for transmitting a first set of criteria for one of said frames; and
   means for transmitting an indicator that causes said first set of criteria to be used for a subsequent one of said frames if a second set of criteria for the subsequent one of said frames is substantially the same as said first set of criteria, without transmitting said second set of criteria.

27. The apparatus as recited in claim 26 wherein said first set of criteria includes at least one enhancement factor value.

28. The apparatus as recited in claim 27 wherein said at least one enhancement factor value corresponds to each element within in said enhancement layer.

29. The apparatus as recited in claim 27 wherein said at least one enhancement factor value is power of two.

30. The apparatus as recited in claim 26 wherein said at least one element is composed of a plurality of elements.

31. The apparatus as recited in claim 30 wherein said first set of criteria includes position, size and enhancement factor value for each of said elements.

32. The apparatus as recited in claim 31 wherein said position is selected with respect to a known point.

33. The apparatus as recited in claim 26 wherein said first set of criteria includes at least a second indicator that indicates a corresponding known value.

34. The apparatus as recited in claim 23 wherein said known values is selected from the group consisting of position, displacement vector, size, and enhancement factor.

35. The apparatus as recited in claim 33 wherein said indicator is substantially the same as said at least a second indicator.

36. The apparatus as recited in claim 26 wherein said enhancement layer is fine granular scalability encoded.

37. A system operational to improve the transmission efficiency of a video signal transmitted as a plurality of frames, said frames containing said video signal encoded in a base layer and an enhancement layer wherein at least one element of said enhancement layer is selectively enhanced by designating said at least one element to have a higher priority of transmission, said system comprising:
- means for transmitting a first set of criteria for one of said frames;
- means for transmitting an indicator if a second set of criteria for a subsequent one of said frames is substantially the same as said first set of criteria, without transmitting said second set of criteria;
- means for receiving said first set of criteria and said indicator; and
- means for applying said first set of criteria to said subsequent one of said frames.

38. The system as recited in claim 37 wherein said first set of criteria includes at least one enhancement factor value.

39. The system as recited in claim 37 wherein said at least one enhancement factor value corresponds to each element within said enhancement layer.

40. A device for improving the transmission efficiency of an original video signal transmitted as a plurality of frames, said frames containing said video signal encoded in a base layer and an enhancement layer wherein at least one element of said enhancement layer is selectively enhanced by designating said at least one element to have a higher priority of transmission, said device comprising:
- code for transmitting a first set of criteria for one of said frames; and
- code for transmitting an indicator that causes said first set of criteria to be used for a subsequent one of said frames if a second set of criteria for the subsequent one of said frames is substantially the same as said first set of criteria, without transmitting said second set of criteria.

* * * * *